(12) United States Patent
Lee (10) Patent No.: US 10,931,933 B2
(45) Date of Patent: Feb. 23, 2021

(54) CALIBRATION GUIDANCE SYSTEM AND OPERATION METHOD OF A CALIBRATION GUIDANCE SYSTEM

(71) Applicant: Etron Technology, Inc., Hsinchu (TW)

(72) Inventor: Chi-Feng Lee, Hsinchu County (TW)

(73) Assignee: eYs3D Microelectronics, Co., Taipei (TW)

( * ) Notice: Subject to any disclaimer, the term of this patent is extended or adjusted under 35 U.S.C. 154(b) by 329 days.

(21) Appl. No.: 14/983,443

(22) Filed: Dec. 29, 2015

(65) Prior Publication Data

US 2016/0198145 A1 Jul. 7, 2016

Related U.S. Application Data

(60) Provisional application No. 62/098,268, filed on Dec. 30, 2014.

(51) Int. Cl.
| | |
|---|---|
| *H04N 13/246* | (2018.01) |
| *G06T 7/80* | (2017.01) |
| *H04N 13/239* | (2018.01) |
| *G06K 9/00* | (2006.01) |

(52) U.S. Cl.
CPC ....... *H04N 13/246* (2018.05); *G06K 9/00912* (2013.01); *G06T 7/85* (2017.01); *H04N 13/239* (2018.05); *G06T 2200/24* (2013.01)

(58) Field of Classification Search
CPC . G06F 3/167; G06K 9/00912; G06T 2200/24; G06T 7/85; H04N 13/0239; H04N 13/0246

USPC .......................................................... 348/47
See application file for complete search history.

(56) References Cited

U.S. PATENT DOCUMENTS

| | | | | |
|---|---|---|---|---|
| 9,002,098 B1* | 4/2015 | Chelian | ............... | G06K 9/4642 |
| | | | | 382/153 |
| 9,503,677 B1* | 11/2016 | Ramaswamy | ......... | H04N 13/02 |
| 9,503,703 B1* | 11/2016 | Ramaswamy | .......... | G06T 5/006 |
| 9,519,976 B1* | 12/2016 | Saltzman | ............... | H05B 45/22 |
| 9,729,865 B1* | 8/2017 | Kuo | ..................... | G06F 1/3231 |
| 9,749,601 B2* | 8/2017 | Yamamoto | ............. | H04N 9/045 |
| 9,866,820 B1* | 1/2018 | Agrawal | .............. | H04N 14/246 |
| 2001/0012985 A1* | 8/2001 | Okamoto | .................. | G06T 7/80 |
| | | | | 702/94 |

(Continued)

FOREIGN PATENT DOCUMENTS

JP 2014069272 A * 4/2014

*Primary Examiner* — Christopher S Kelley
*Assistant Examiner* — Kathleen M Walsh
(74) *Attorney, Agent, or Firm* — Winston Hsu (57) ABSTRACT

An operation method of a calibration guidance system includes a feature extraction unit executing a feature extraction operation on a first image group including a first object captured by a multi-camera system to generate a first feature point group corresponding to a predetermined position within an image capture range of the multi-camera system; and a guidance unit determining whether to generate a direction indication to guide the first object to another predetermined position within an image capture range according to a first comparison result between a block corresponding to feature points of the first feature point group of the predetermined position and a predetermined block when a number of the feature points of the first feature point group is greater than a predetermined number.

18 Claims, 8 Drawing Sheets

(56) References Cited

U.S. PATENT DOCUMENTS

| | | | |
|---|---|---|---|
| 2008/0123938 A1* | 5/2008 | Kim | H04N 13/0018 382/154 |
| 2010/0194863 A1* | 8/2010 | Lopes | G06T 7/12 348/50 |
| 2011/0025828 A1* | 2/2011 | Ishiyama | G06T 7/593 348/47 |
| 2012/0105585 A1* | 5/2012 | Masalkar | H04N 13/271 348/46 |
| 2012/0147139 A1* | 6/2012 | Li | G03B 35/08 348/43 |
| 2012/0162374 A1* | 6/2012 | Markas | H04N 13/128 348/46 |
| 2013/0004079 A1* | 1/2013 | Yamada | G06T 7/33 382/190 |
| 2013/0021449 A1* | 1/2013 | Tani | G01B 11/002 348/47 |
| 2013/0093760 A1* | 4/2013 | Kwon | H04N 13/264 345/419 |
| 2013/0147948 A1* | 6/2013 | Higuchi | H04N 13/246 348/135 |
| 2013/0169761 A1* | 7/2013 | Inoue | G03B 17/14 348/49 |
| 2013/0286161 A1* | 10/2013 | Lv | G06K 9/036 348/46 |
| 2014/0118503 A1* | 5/2014 | Luo | H04N 13/0246 348/47 |
| 2015/0103147 A1* | 4/2015 | Ho | G06T 7/85 348/47 |
| 2015/0130951 A1* | 5/2015 | Olson | H04N 17/002 348/184 |
| 2015/0213589 A1* | 7/2015 | Chou | G06T 7/85 348/47 |
| 2015/0256815 A1* | 9/2015 | Grafulla-Gonzalez | G06F 3/011 348/46 |

* cited by examiner

CALIBRATION GUIDANCE SYSTEM AND OPERATION METHOD OF A CALIBRATION GUIDANCE SYSTEM

CROSS REFERENCE TO RELATED APPLICATIONS

This application claims the benefit of U.S. Provisional Application No. 62/098,268, filed on Dec. 30, 2014 and entitled "Method for free space calibrate stereo camera," the contents of which are incorporated herein by reference.

BACKGROUND OF THE INVENTION

1. Field of the Invention

The present invention relates to a calibration guidance system and an operation method of a calibration guidance system, and particularly to a calibration guidance system and an operation method of a calibration guidance system that can calibrate a multi-camera system without a specific calibration pattern.

2. Description of the Prior Art

Before a stereo camera is shipped, a manufacturer of the stereo camera can utilize automation calibration to maintain mechanism accuracy required by the stereo camera. However, after the stereo camera is shipped, the above mentioned mechanism accuracy required by the stereo camera may not be maintained due to a usage environment or a usage way of the stereo camera (e.g. the usage environment or the usage way of the stereo camera can change positions or capture image angles of left/right eye image capture units of the stereo camera). Therefore, after the stereo camera is shipped and the stereo camera is operated by a user for a period of time, the stereo camera needs to be executed an image rectification again to compensate shift of the mechanism accuracy of the stereo camera.

Calibration methods provided by the prior art mainly provide a checkerboard test pattern, and so on to let the user utilize the checkerboard test pattern, and so on to repeatedly execute the image rectification on the stereo camera. However, most of the calibration methods provided by the prior art can be properly executed by professional trained technicians and automation calibration equipments in a manufactory of the stereo camera. Therefore, when the stereo camera needs to be executed the image rectification after the user operates the stereo camera for a period of time, the user may need to return the stereo camera to the manufacturer of the stereo camera. Thus, the prior art is inconvenient and time-consuming, and needs addition cost for the user.

SUMMARY OF THE INVENTION

An embodiment of the present invention provides an operation method of a calibration guidance system, wherein the calibration guidance system includes a feature extraction unit, a guidance unit, and an operation unit. The operation method includes the feature extraction unit executing a feature extraction operation on a first image group including a first object captured by a multi-camera system to generate a first feature point group corresponding to a predetermined position within an image capture range of the multi-camera system; the guidance unit determining whether to generate a direction indication to guide the first object to another predetermined position within the image capture range according to a first comparison result between a block corresponding to feature points of the first feature point group of the predetermined position and a predetermined block when a number of feature points of the first feature point group corresponding to the predetermined position is greater than a predetermined number.

Another embodiment of the present invention provides a calibration guidance system. The calibration guidance system includes a feature extraction unit and a guidance unit. The feature extraction unit is used for executing a feature extraction operation on a first image group including a first object captured by a multi-camera system to generate a first feature point group corresponding to a predetermined position within an image capture range of the multi-camera system. The guidance unit is used for determining whether to generate a direction indication to guide the first object to another predetermined position within the image capture range according to a first comparison result between a block corresponding to feature points of the first feature point group of the predetermined position and a predetermined block when a number of feature points of the first feature point group corresponding to the predetermined position is greater than a predetermined number.

Another embodiment of the present invention provides an operation method of a calibration guidance system, wherein the calibration guidance system includes a feature extraction unit and a guidance unit. The operation method includes the feature extraction unit executing a feature extraction operation on a first image group comprising a first object captured by a multi-camera system to generate a first feature point group corresponding to a predetermined position within an image capture range of the multi-camera system; and the guidance unit determining whether to generate a direction indication to guide the first object to another predetermined position within the image capture range according to a predetermined condition when a number of the feature points of the first feature point group corresponding to the predetermined position is greater than a predetermined number.

The present invention provides a calibration guidance system and an operation method of a calibration guidance system. The calibration guidance system and the operation method utilize a guidance unit to guide an object having enough feature points or a multi-camera system to make the object having enough feature points located on at least one predetermined position within the image capture range of the multi-camera system, utilize a feature extraction unit to generate feature point groups corresponding to the at least one predetermined position, and utilize an operation unit to generate a plurality of image rectification parameters corresponding to the multi-camera system according to the feature point groups corresponding to the at least one predetermined position. Therefore, compared to the prior art, because the present invention can utilize the guidance unit to guide the object having enough feature points or the multi-camera system to make the object having enough feature points located on the at least one predetermined position within the image capture range of the multi-camera system, the present invention can execute image rectification on the multi-camera system without a specific calibration pattern, a specific calibration equipment, and a professional trained technician.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
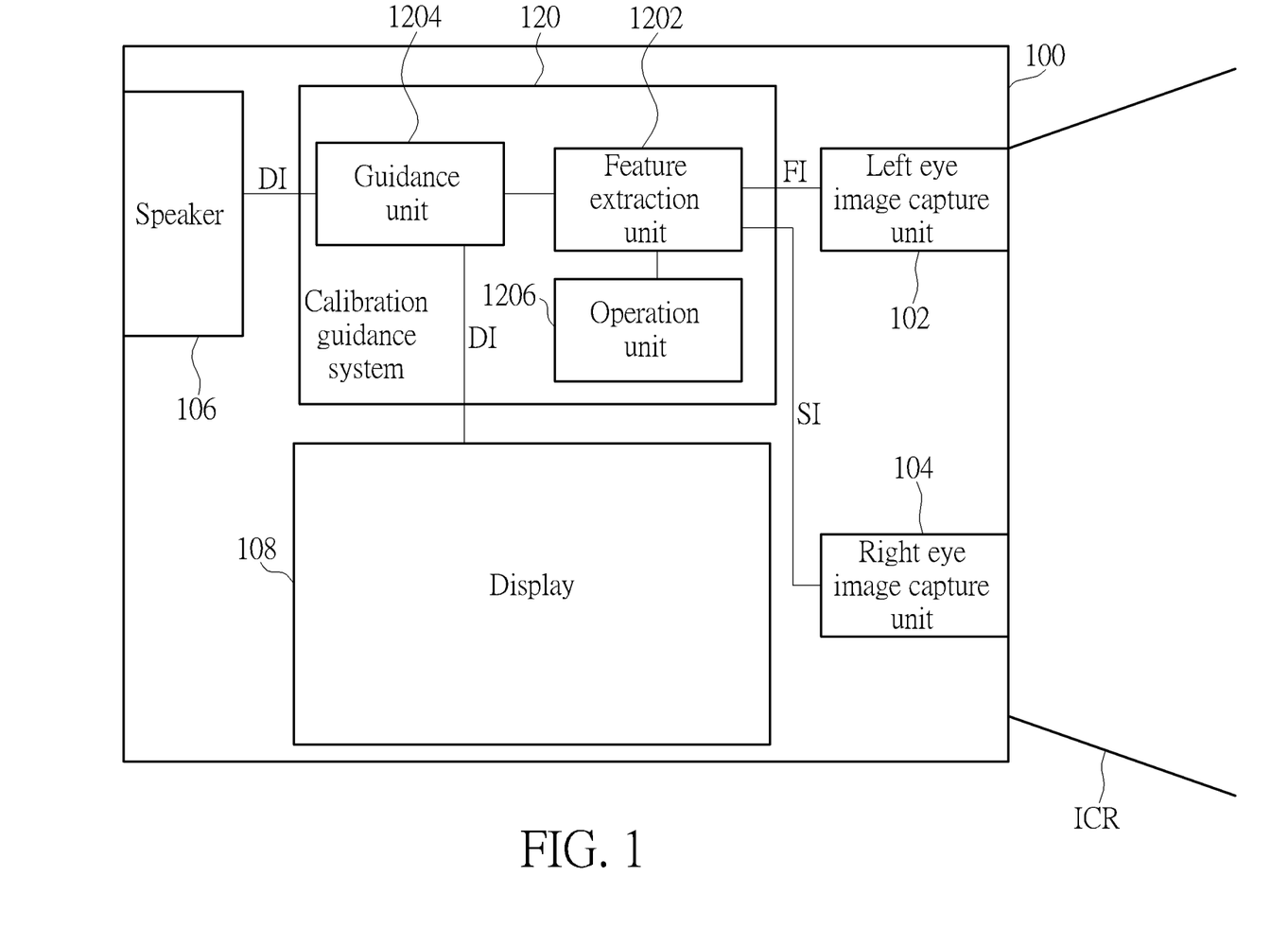
FIG. 1 is a diagram illustrating a calibration guidance system applied to a multi-camera system according to a first embodiment of the present invention.
Figure 2A:
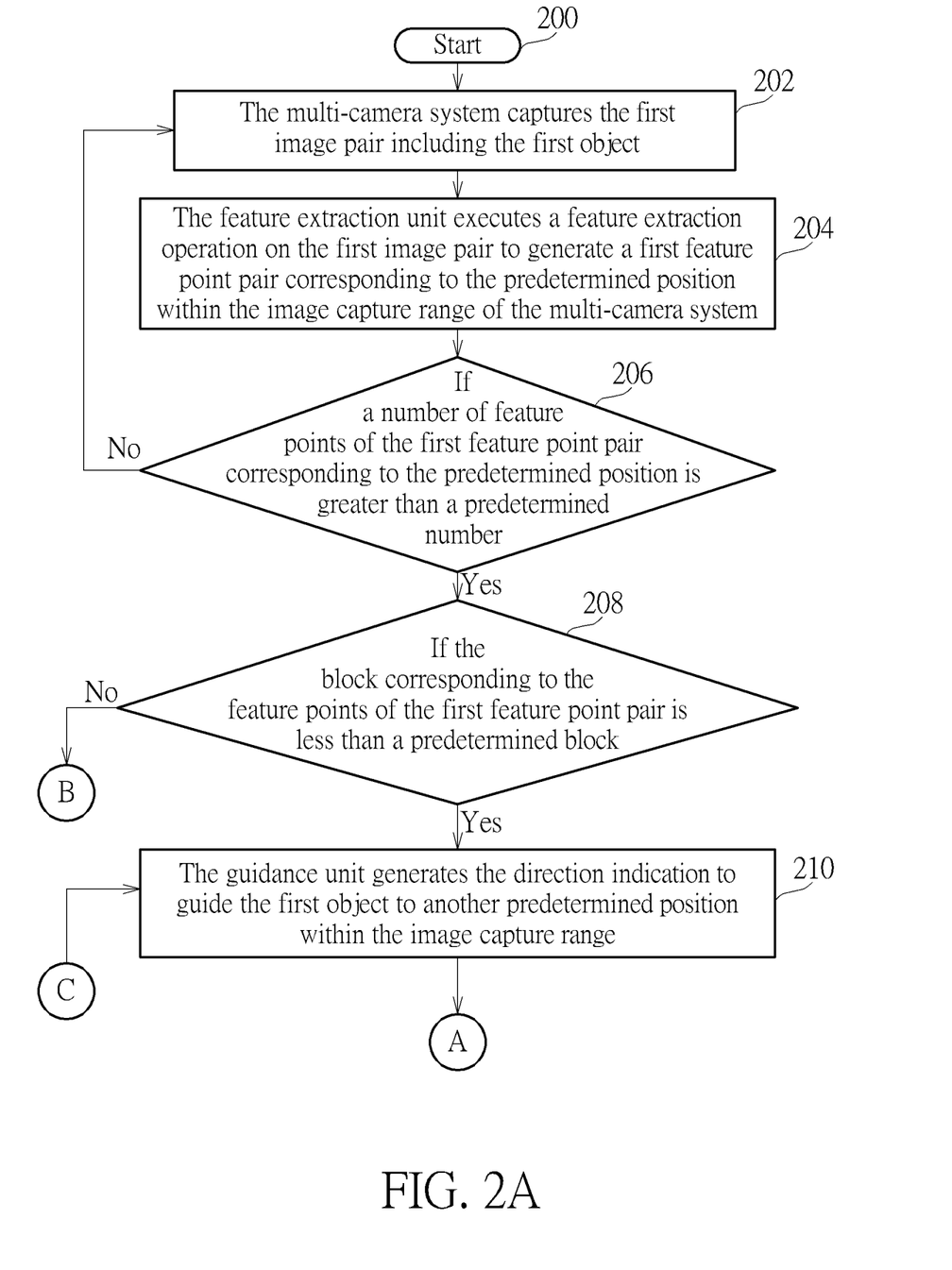
FIGS. 2A, 2B are flowcharts illustrating an operation method of a calibration guidance system according to a second embodiment of the present invention.
Figure 2B:
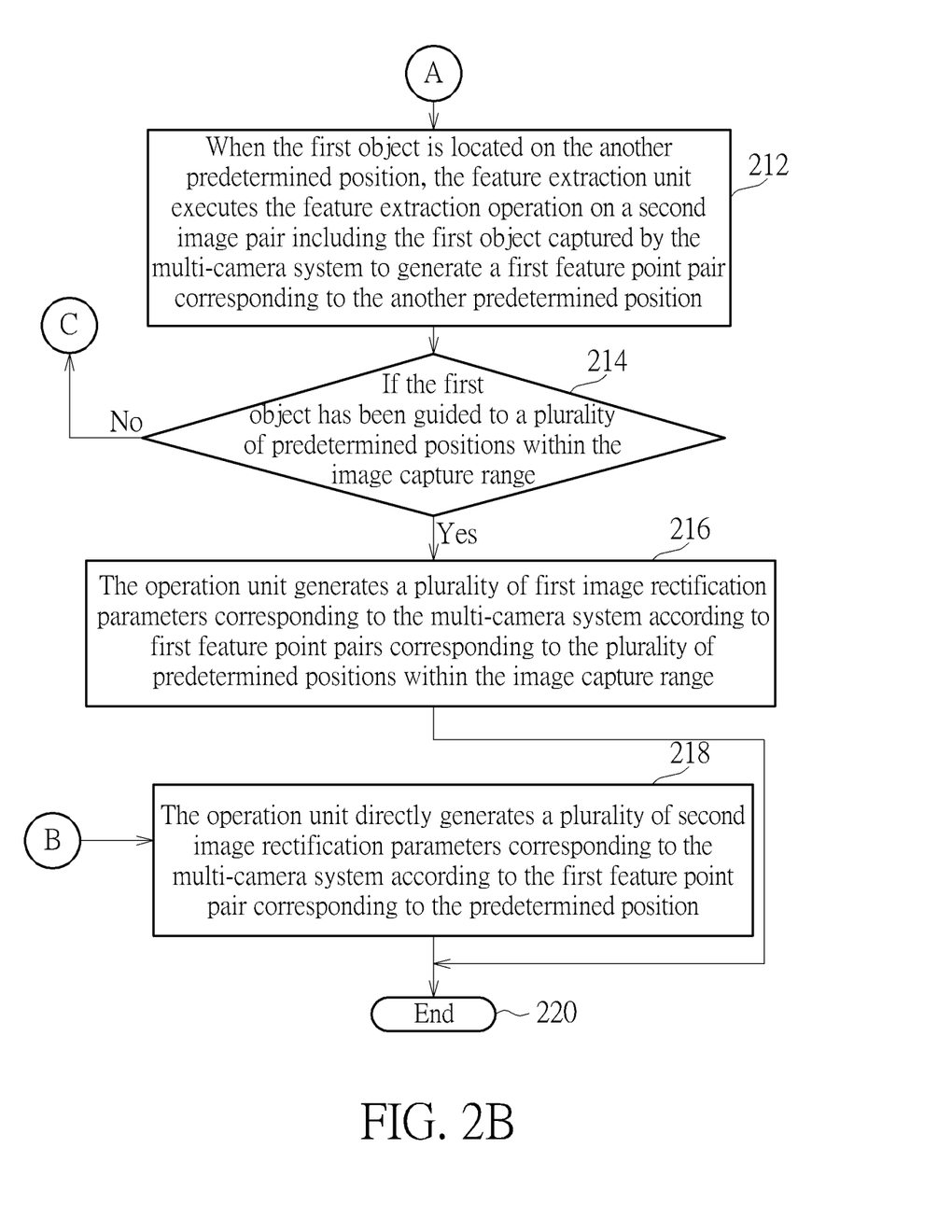
Figure 3:
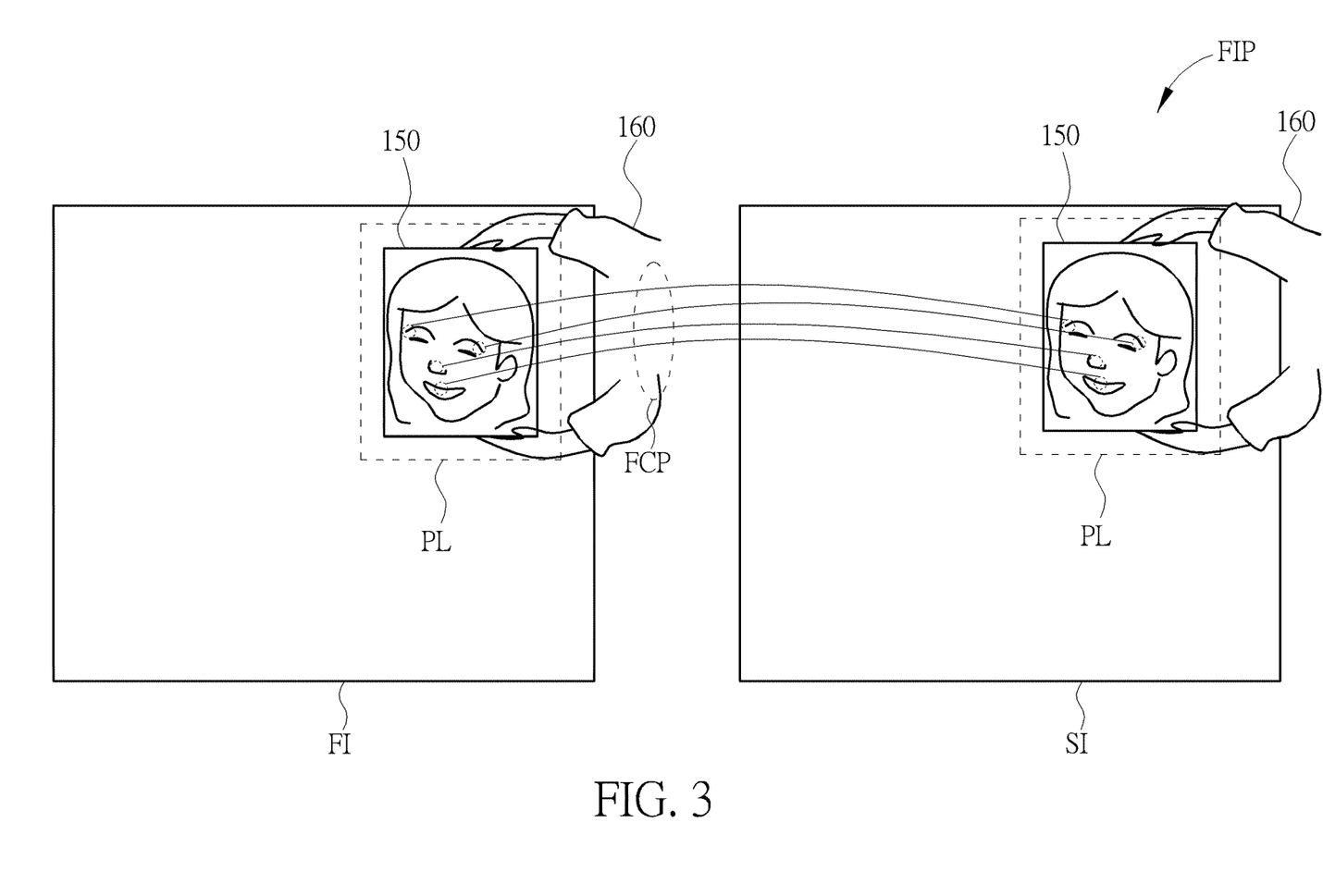
FIG. 3 is a diagram illustrating a first image pair.
Figure 4:
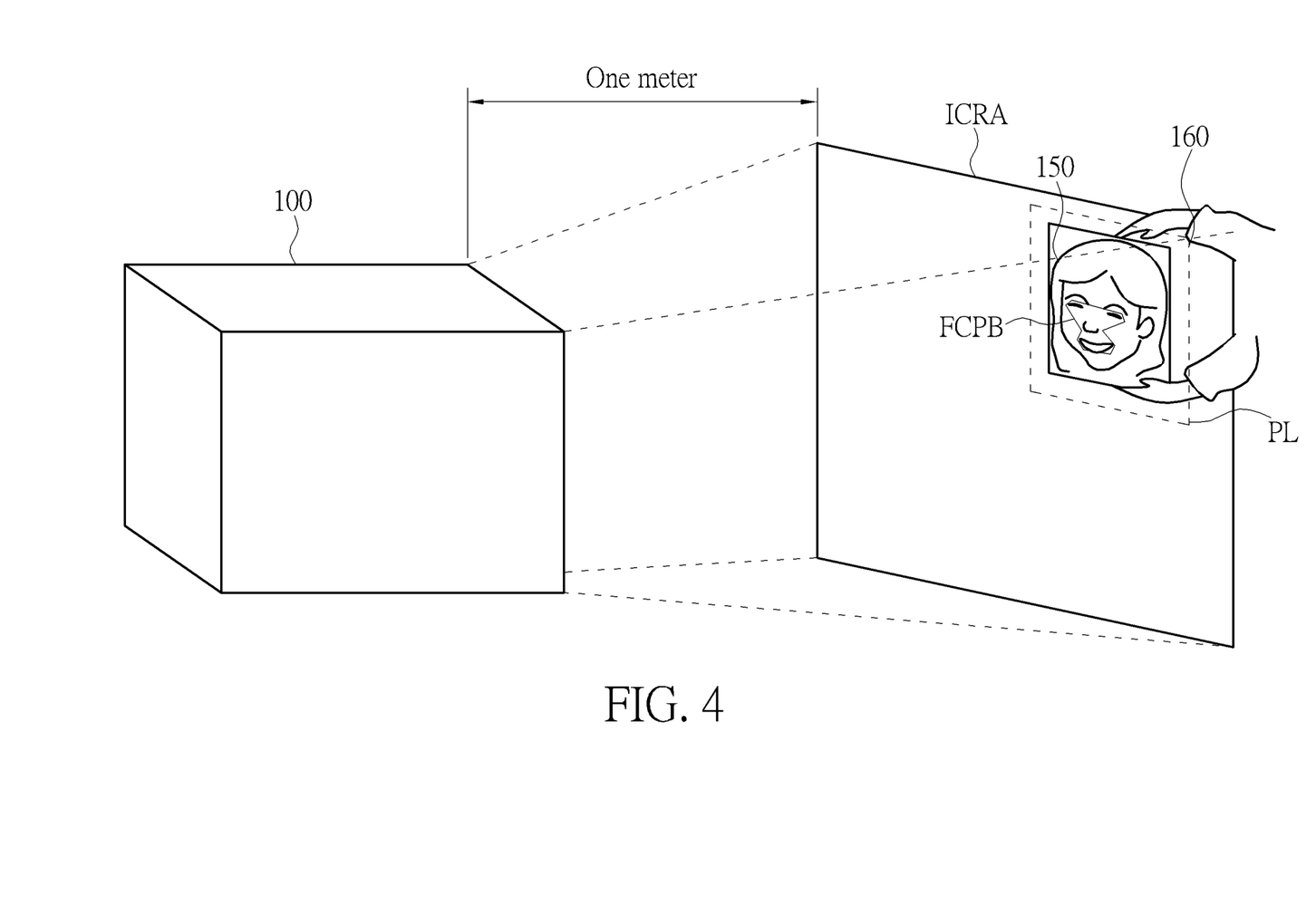
FIG. 4 is a diagram illustrating a block corresponding to feature points of a first feature point pair within a first object and an area of an image capture range of the multi-camera system at the depth.
Figure 5:
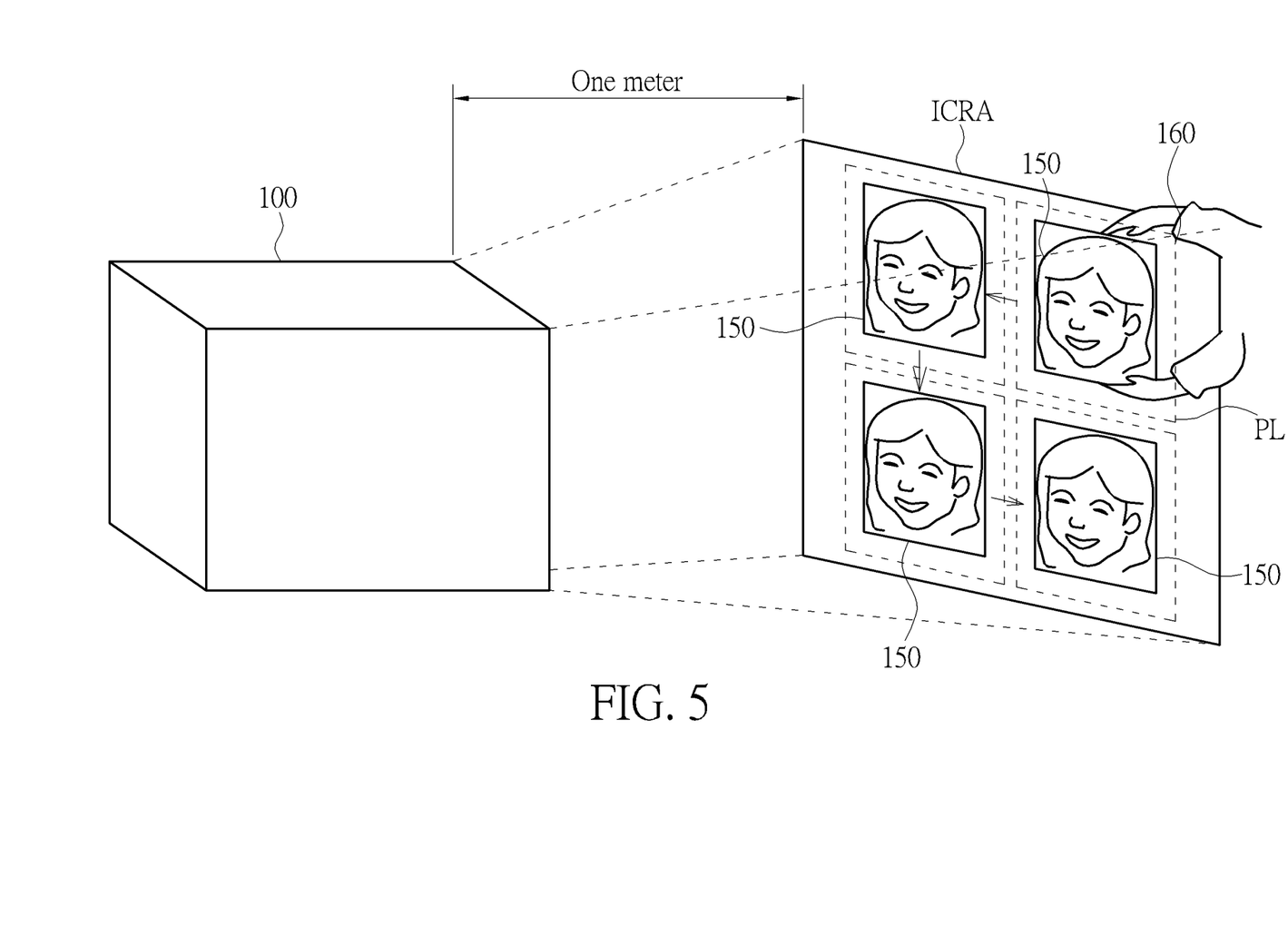
FIG. 5 is a diagram illustrating a user making the first object be moved to upper left, lower left, upper right, and lower right of the image capture range.
Figure 6:
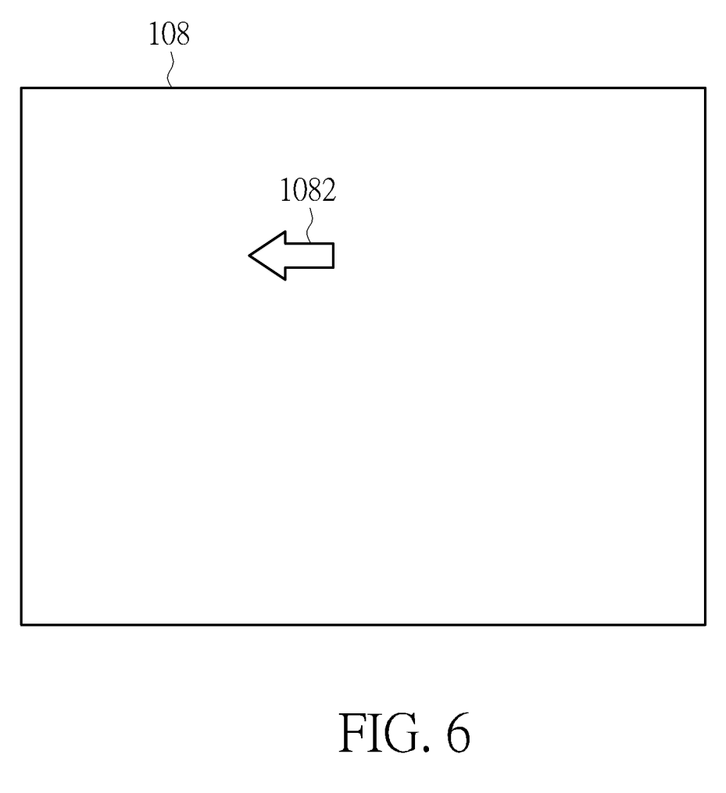
FIG. 6 is a diagram illustrating a direction indication displayed by a display of the multi-camera system being an arrow toward the left.
Figure 7:
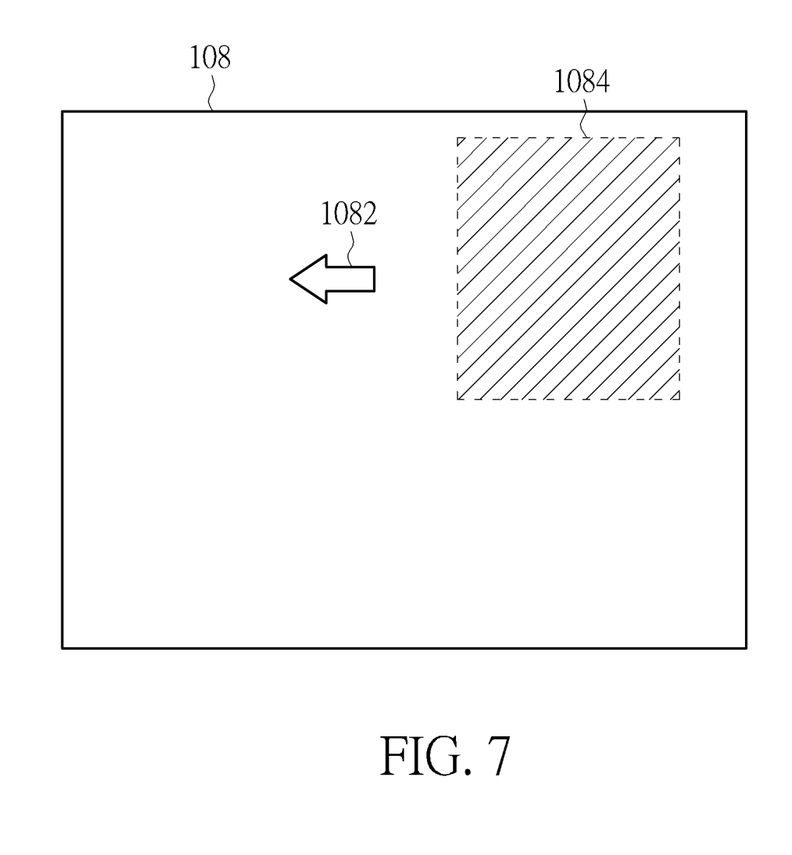
FIG. 7 is a diagram illustrating the display displaying the arrow and highlighting a block corresponding to a predetermined position.

Please refer to FIG. 1. FIG. 1 is a diagram illustrating a calibration guidance system 120 applied to a multi-camera system 100 according to a first embodiment of the present invention, wherein the multi-camera system 100 includes a left eye image capture unit 102 and a right eye image capture unit 104, and the calibration guidance system 120 includes a feature extraction unit 1202, a guidance unit 1204, and an operation unit 1206. But, the present invention is not limited to the multi-camera system 100 including the left eye image capture unit 102 and the right eye image capture unit 104. That is to say, the multi-camera system 100 can include more than two image capture units. Please refer to FIGS. 1, 2A, 2B, 3-7. FIGS. 2A, 2B are flowcharts illustrating an operation method of a calibration guidance system according to a second embodiment of the present invention, FIG. 3 is a diagram illustrating a first image pair FIP, FIG. 4 is a diagram illustrating a block FCPB corresponding to feature points of a first feature point pair FCP within a first object 150 and an area of an image capture range ICR of the multi-camera system 100 at the depth, FIG. 5 is a diagram illustrating a user 160 making the first object 150 be moved to upper left, lower left, upper right, and lower right of the image capture range ICR, FIG. 6 is a diagram illustrating a direction indication DI displayed by a display 108 of the multi-camera system 100 being an arrow 1082 toward the left, and FIG. 7 is a diagram illustrating the display 108 displaying the arrow 1082 and highlighting a block 1084 corresponding to a predetermined position PL. The operation method in FIGS. 2A, 2B is illustrated using the multi-camera system 100 and the calibration guidance system 120 in FIG. 1. Detailed steps are as follows:

Step 200: Start.

Step 202: The multi-camera system 100 captures the first image pair FIP including the first object 150.

Step 204: The feature extraction unit 1202 executes a feature extraction operation on the first image pair FIP to generate a first feature point pair FCP corresponding to the predetermined position PL within the image capture range ICR of the multi-camera system 100.

Step 206: If a number of feature points of the first feature point pair FCP corresponding to the predetermined position PL is greater than a predetermined number; if yes, go to Step 208; if no, go to Step 202.

Step 208: If the block FCPB corresponding to the feature points of the first feature point pair FCP is less than a predetermined block; if yes, go to Step 210; if no, go to Step 218.

Step 210: The guidance unit 1204 generates the direction indication DI to guide the first object 150 to another predetermined position within the image capture range ICR.

Step 212: When the first object 150 is located on the another predetermined position, the feature extraction unit 1202 executes the feature extraction operation on a second image pair including the first object 150 captured by the multi-camera system 100 to generate a first feature point pair corresponding to the another predetermined position.

Step 214: If the first object 150 has been guided to a plurality of predetermined positions within the image capture range ICR; if yes, go to Step 216; if no, go to Step 210.

Step 216: The operation unit 1206 generates a plurality of first image rectification parameters corresponding to the multi-camera system 100 according to first feature point pairs corresponding to the plurality of predetermined positions within the image capture range ICR, go to Step 220.

Step 218: The operation unit 1206 directly generates a plurality of second image rectification parameters corresponding to the multi-camera system 100 according to the first feature point pair FCP corresponding to the predetermined position PL, go to Step 220.

Step 220: End.

In Step 202, as shown in FIG. 3, the first image pair FIP includes a first image FI and a second image SI, wherein the first image FI is a left eye image captured by the left eye image capture unit 102 and a second image SI is a right eye image captured by the right eye image capture unit 104, the first image FI and the second image SI are used for forming a three-dimensional image, and the first object 150 in the first image FI and the second image SI is held by the user 160. But, the present invention is not limited to the user 160 holding the first object 150. That is to say, any method which can make the first object 150 move within the image capture range ICR of the multi-camera system 100 falls within the scope of the present invention. In addition, the present invention is not limited to the first object 150 being a monolithic object, that is, the first object 150 can also be any environment or an object group having a plurality of feature points. In addition, because the multi-camera system 100 includes the left eye image capture unit 102 and the right eye image capture unit 104, the multi-camera system 100 generates the first image pair FIP including the first object 150. But, in another embodiment of the present invention, because the multi-camera system 100 includes more than two image capture units, the multi-camera system 100 generates a first image group including the first object 150. In addition, the first object 150 included in the first image FI and the first object 150 included in the second image SI are in a static state. That is to say, when movement amount of the first object 150 included in the first image FI and movement amount of the first object 150 included in the second image SI exceed a predetermined level, the feature extraction unit 1202 will give up the first image pair FIP. In addition, the first object 150 is located on the predetermined position PL within the image capture range ICR, wherein when the user 160 makes the first object 150 move at the same depth within the image capture range ICR, a number of predetermined positions within the image capture range ICR can be determined by a ratio of the block FCPB (as shown in FIG. 4, the block FCPB is a convex polygon formed by a left eye, a right eye, a nose, and lips of the first object 150) within the first object 150 corresponding to the feature points (e.g. the left eye, the right eye, the nose, and the lips of the first object 150) of the first feature point pair FCP to an area of the image capture range ICR at the depth. But, the present invention is not limited to the block FCPB being the convex polygon formed by the left eye, the right eye, the nose, and the lips of the first object 150, that is, the block FCPB can be any block within the first object 150 including the left eye, the right eye, the nose, and the lips of the first object 150. Further, in another embodiment of the present invention, a number of feature points corresponding to a unit area of the any block within the first object 150 including the left eye, the right eye, the nose, and the lips of the first object 150 needs to be greater than a predetermined value. For example, when the user 160 makes the first object 150 move at the depth of one meter within the image capture range ICR, meanwhile the ratio of the block FCPB to an area ICRA of the image capture range ICR at the depth of one meter is equal to ¼ (as shown in FIG. 4). But, the present invention is not limited to the ratio of the block FCPB to the area ICRA of the image capture range ICR at the depth of one meter being equal to ¼. As shown in FIG. 4, because the ratio of the block FCPB to the area ICRA of the image capture range ICR at the depth of one meter is equal to ¼, the number of the predetermined positions within the image capture range ICR is about equal to 4. That is to say, when the user 160 makes the first object 150 move at the depth of one meter within the image capture range ICR, the user 160 can move the first object 150 to the upper left, the lower left, the upper right, and the lower right within the image capture range ICR (as shown in FIG. 5) to make the feature extraction unit 1202 capture most of first feature point pairs corresponding to the same depth (that is, the depth of one meter) within the image capture range ICR. However, in another embodiment of the present invention, the number of the predetermined positions within the image capture range ICR is determined by a number of the different depths within the image capture range ICR. For example, the user 160 can move the first object 150 straight to the depths of one meter, two meter, and three meter within the image capture range ICR, so meanwhile the number of the predetermined positions within the image capture range ICR is equal to 3. In addition, in another embodiment of the present invention, the number of the predetermined positions within the image capture range ICR can be determined by the different depths within the image capture range ICR and different positions corresponding to each depth of the different depths. For example, the number of the predetermined positions within the image capture range ICR is equal to a sum of 4 positions corresponding to the depth of one meter within the image capture range ICR, 8 positions corresponding to the depth of two meter within the image capture range ICR corresponding to image capture range ICR, and 12 positions corresponding to the depth of three meter within the image capture range ICR corresponding to image capture range ICR (that is, the number of the predetermined positions within the image capture range ICR is equal to 24). In Step 204, as shown in FIG. 3, the feature extraction unit 1202 executes the feature extraction operation on the first image pair FIP to generate the first feature the point pair FCP (e.g. a left eye, a right eye, a nose and lips of the first object 150 in the first image FI and a left eye, a right eye, a nose and lips of the first object 150 in the second image SI form the first feature point pair FCP, respectively) corresponding to the predetermined position PL. That is to say, the feature extraction unit 1202 generates the first feature point pair FCP corresponding to the predetermined position PL according to the first image FI and the second image SI included in the first image pair FIP, and a feature matching algorithm, wherein the feature matching algorithm is an algorithm provided by the prior art (e.g. Scale-invariant feature transform (SIFT), Speeded-Up Robust Features (SURF), and so on), so further description thereof is omitted for simplicity. In Step 206, if the number of the feature points of the first feature point pair FCP corresponding to the predetermined position PL is less than the predetermined number, it means that the first object 150 is not proper for calibrating the multi-camera system 100. Therefore, the user 160 can select a second object, and the calibration guidance system 120 can execute Steps 202, 204 on the second object to generate a second feature point pair corresponding to the predetermined position PL. Then, if a number of feature points of the second feature point pair is still less than the predetermined number, it means that the second object is also not proper for calibrating the multi-camera system 100. Therefore, the user 160 can select another object until the another object can be proper for calibrating the multi-camera system 100.

In Step 210, if the number of the feature points of the first feature point pair FCP corresponding to the predetermined position PL is greater than the predetermined number, it means that the first object 150 is proper for calibrating the multi-camera system 100, so the guidance unit 1204 can generate the direction indication DI to guide the first object 150 to the another predetermined position within the image capture range ICR, wherein the direction indication DI is a voice indication, a text indication, or an image indication. When the direction indication DI is a voice indication, the direction indication DI can be outputted through a speaker 106 of the multi-camera system 100; and when the direction indication DI is a text indication or an image indication, the direction indication DI can be displayed on the display 108 of the multi-camera system 100. For example, as shown in FIGS. 4, 6, when the direction indication DI displayed on the display 108 of the multi-camera system 100 is the arrow 1082, the user 160 can make the first object 150 move to the upper left (that is, the another predetermined position within the image capture range ICR) of the image capture range ICR according to a guidance of the direction indication DI. In addition, in another embodiment of the present invention, when the direction indication DI is a text indication or an image indication, the direction indication DI is displayed on a display of a host (not shown in FIG. 1) coupled to the multi-camera system 100. In addition, in another embodiment of the present invention, the calibration guidance system 120 is applied to the host (not shown in FIG. 1) coupled to the multi-camera system 100, so when the direction indication DI is a voice indication, the direction indication DI can be outputted through a speaker (not shown in FIG. 1) of the host; and when the direction indication DI is a text indication or an image indication, the direction indication DI can be displayed on the display of the host (not shown in FIG. 1). In addition, in another embodiment of the present invention, when the direction indication DI displayed on the display 108 of the multi-camera system 100 is the arrow 1082, the first object 150 is fixed by the user 160 and the multi-camera system 100 is moved to make the first object 150 located on the upper left (that is, the another predetermined position within the image capture range ICR) of the image capture range ICR.

In Step 212, when the first object 150 is located on the upper left (that is, the another predetermined position within the image capture range ICR) of the image capture range ICR, the feature extraction unit 1202 can execute the feature extraction operation on the second image pair including the first object 150 captured by the multi-camera system 100 to generate the first feature point pair corresponding to the upper left (that is, the another predetermined position within the image capture range ICR) of the image capture range ICR. In addition, in another embodiment of the present invention, when the number of the feature points of the first feature point pair FCP corresponding to the predetermined position PL is greater than the predetermined number, the guidance unit 1204 not only can generate the arrow 1082 to guide the first object 150 to the upper left (that is, the another predetermined position within the image capture range ICR) of the image capture range ICR, but can also make the display 108 highlight the block 1084 corresponding to the predetermined position PL (shown in FIG. 7), wherein the block 1084 displayed on the display 108 is used for pointing out that the feature extraction unit 1202 has generated the first feature point pair FCP corresponding to the predetermined position PL, and the block 1084 has color, luminance, or color and luminance different from other blocks of the display 108.

In Step 214, the first object 150 can be guided to the all predetermined position within the image capture range ICR (e.g. the upper left, the lower left, the upper right, and the lower right of the image capture range ICR) according to the direction indication DI generated by the guidance unit 1204. In Step 216, the operation unit 1206 can generate the plurality of first image rectification parameters corresponding to the multi-camera system 100 according to the all first feature point pairs corresponding to the all predetermined positions within the image capture range ICR generated by the feature extraction unit 1202 (that is, first feature point pairs corresponding to the upper left, the lower left, the upper right, and the lower right of the image capture range ICR generated by the feature extraction unit 1202). After the operation unit 1206 generates the plurality of first image rectification parameters corresponding to the multi-camera system 100, if a rectified three-dimensional image generated by the multi-camera system 100 according to the plurality of first image rectification parameters cannot meet a requirement of the user 160 owning the multi-camera system 100, the user 160 can repeatedly execute the above mentioned steps until the rectified three-dimensional image generated by the multi-camera system 100 can meet the requirement of the user 160. For example, in one embodiment of the present invention, after the multi-camera system 100 generates the rectified three-dimensional image (wherein the rectified three-dimensional image includes a first rectified image and a second rectified image) according to the plurality of first image rectification parameters, if a sum of differences of horizontal positions between all feature points included in the first rectified image and all corresponding feature points included in the second rectified image is greater than a default value, the user 160 can repeatedly execute the above mentioned steps until the sum of the differences of the horizontal positions between the all feature points included in the first rectified image and the all corresponding feature points included in the second rectified image is less than the default value. But, the present invention is not limited to the above mentioned method for determining whether the rectified three-dimensional image generated by the multi-camera system 100 meets the requirement of the user 160.

Further, Step 208 is a predetermined condition disclosed by the claim 19. But, the present invention is not limited to the predetermined condition disclosed by the claim 19 being Step 208. In Step 208, in one embodiment of the present invention, the predetermined block is a half of the area ICRA of the image capture range ICR at the depth of one meter. Therefore, in Step 218, when the block FCPB of the feature points of the first feature point pair FCP of the first object 150 corresponding to the predetermined position PL is greater than the predetermined block (that is, the half of the area ICRA of the image capture range ICR at the depth of one meter), because the block FCPB of the feature points of the first feature point pair FCP of the first object 150 corresponding to the predetermined position PL can occupy more than the half of the area ICRA of the image capture range ICR at the depth of one meter, meanwhile the operation unit 1206 can directly generate the plurality of second image rectification parameters corresponding to the multi-camera system 100 according to the first feature point pair FCP corresponding to the predetermined position PL. In addition, the present invention is not limited to the predetermined block being the half of the area ICRA of the image capture range ICR at the depth of one meter. Further, a concept in Step 208 is the same as a concept of determining whether the feature points of the first feature point pair FCP of the first object 150 corresponding to the predetermined position PL are dispersed in the image capture range ICR evenly.

To sum up, the calibration guidance system and the operation method of the calibration guidance system utilize the guidance unit to guide an object having enough feature points or the multi-camera system to make the object having enough feature points located on at least one predetermined position within the image capture range of the multi-camera system, utilize the feature extraction unit to generate feature point groups corresponding to the at least one predetermined position, and utilize the operation unit to generate a plurality of image rectification parameters corresponding to the multi-camera system according to the feature point groups corresponding to the at least one predetermined position. Therefore, compared to the prior art, because the present invention can utilize the guidance unit to guide the object having enough feature points or the multi-camera system to make the object having enough feature points located on the at least one predetermined position within the image capture range of the multi-camera system, the present invention can execute image rectification on the multi-camera system without a specific calibration pattern, a specific calibration equipment, and a professional trained technician.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An operation method of a calibration guidance system, the calibration guidance system comprising a feature extraction circuit, a guidance circuit, and an operation circuit, the operation method comprising:

the feature extraction circuit executing a feature extraction operation on a first image group comprising a first object captured by a multi-camera system to generate a first feature point group corresponding to a predetermined position within an image capture range of the multi-camera system, wherein the first object is a physical object for calibrating the multi-camera system, rather than at least one pixel of the first image group; and when a number of first feature points of the first feature point group corresponding to the predetermined position is greater than a predetermined number, the guidance circuit determining whether to generate a movement indication, wherein when a first area corresponding to the first feature points is less than an area of a predetermined block, the guidance circuit generates the movement indication;

wherein when the first area is greater than the area of the predetermined block, the guidance circuit does not generate the movement indication, and the operation circuit generates first image rectification parameters corresponding to the multi-camera system according to the first feature point group corresponding to the predetermined position within the image capture range.

2. The operation method of claim 1, wherein the feature extraction operation comprises:

the feature extraction circuit generating the first feature point group corresponding to the predetermined position according to a plurality of images comprised in the first image group and a feature matching algorithm.

3. The operation method of claim 1, wherein the movement indication is a voice indication, a text indication, or an image indication.

4. The operation method of claim 1, wherein the feature extraction circuit executing the feature extraction operation on a second image group comprising the first object captured by the multi-camera system to generate a first feature point group corresponding to another predetermined position when the first object is located on the another predetermined position.

5. The operation method of claim 4, wherein the first object comprised in the first image group and the first object comprised in the second image group are in a static state.

6. The operation method of claim 1, wherein the feature extraction circuit generates a first feature point group corresponding to the another predetermined position and the operation circuit generates first second image rectification parameters corresponding to the multi-camera system according to first feature point groups corresponding to a plurality of predetermined positions within the image capture range when the guidance circuit generates the movement indication.

7. The operation method of claim 1, further comprising:

when the number of the first feature points is less than the predetermined number, the feature extraction circuit executing the feature extraction operation on a third image group comprising a second object captured by the multi-camera system to generate a second feature point group corresponding to the predetermined position;

when a number of second feature points of the second feature point group corresponding to the predetermined position is greater than the predetermined number, the guidance circuit determining whether to generate the movement indication to guide the second object to move from the predetermined position to the another predetermined position, wherein when a second area of a block corresponding to the second feature points is less than the area of the predetermined block, the guidance circuit generates the movement indication; and when the second area is greater than the area of the predetermined block, the guidance circuit does not generate the movement indications; and the operation circuit generating third image rectification parameters corresponding to the multi-camera system according to second feature point groups corresponding to at least one predetermined position within the image capture range.

8. A calibration guidance system, comprising:

a feature extraction circuit executing a feature extraction operation on a first image group comprising a first object captured by a multi-camera system to generate a first feature point group corresponding to a predetermined position within an image capture range of the multi-camera system, wherein the first object is a physical object for calibrating the multi-camera system, rather than at least one pixel of the first image group;

a guidance circuit, wherein when a number of first feature points of the first feature point group corresponding to the predetermined position is greater than a predetermined number, the guidance circuit determines whether to generate a movement indication, wherein when a first area corresponding to the first feature points is less than an area of a predetermined block, the guidance circuit generates the movement indication; and an operation circuit;

wherein when the first area is greater than the area of the predetermined block, the operation circuit further generates first image rectification parameters corresponding to the multi-camera system according to the first feature point group corresponding to the predetermined position within the image capture range.

9. The calibration guidance system of claim 8, wherein the feature extraction circuit executing the feature extraction operation on the first image group to generate the first feature point group corresponding to the predetermined position is the feature extraction circuit generating the first feature point group corresponding to the predetermined position according to a plurality of images comprised in the first image group and a feature matching algorithm.

10. The calibration guidance system of claim 8, wherein the movement indication is a voice indication, a text indication, or an image indication.

11. The calibration guidance system of claim 8, wherein the feature extraction circuit executes the feature extraction operation on a second image group comprising the first object captured by the multi-camera system to generate a first feature point group corresponding to another predetermined position when the first object is located on the another predetermined position.

12. The calibration guidance system of claim 11, wherein the first object comprised in the first image group and the first object comprised in the second image group are in a static state.

13. The calibration guidance system of claim 8, further comprising:

an operation circuit;

wherein the feature extraction circuit generates a first feature point group corresponding to another predetermined position and the operation circuit generates second image rectification parameters corresponding to the multi-camera system according to first feature point groups corresponding to a plurality of predetermined positions within the image capture range when the guidance circuit generates the movement indication.

14. The calibration guidance system of claim 8, wherein when the number of the first feature points is less than the predetermined number, the feature extraction circuit further executes the feature extraction operation on a third image group comprising a second object captured by the multi-camera system to generate a second feature point group corresponding to the predetermined position.

15. The calibration guidance system of claim 14, wherein when a number of second feature points of the second feature point group is greater than the predetermined number, the guidance circuit further determines whether to generate the movement indication to guide the second object to another predetermined position according to a second comparison result between aft second area of a block corresponding to the second feature points of the second feature point group of the predetermined position and the area of the predetermined block.

16. The calibration guidance system of claim 15, further comprising:
an operation circuit;
wherein the operation circuit generates third image rectification parameters corresponding to the multi-camera system according to second feature point groups corresponding to at least one predetermined position within the image capture range.

17. An operation method of a calibration guidance system, the calibration guidance system comprising a feature extraction circuit, a guidance circuit, and an operation circuit, the operation method comprising:
the feature extraction circuit executing a feature extraction operation on a first image group comprising a first object captured by a multi-camera system to generate a first feature point group corresponding to a predetermined position within an image capture range of the multi-camera system, wherein the first object is a physical object for calibrating the multi-camera system, rather than at least one pixel of the first image group; and
when a number of first feature points of the first feature point group corresponding to the predetermined position is greater than a predetermined number, the guidance circuit determining whether to generate a movement indication according to a predetermined condition, wherein the predetermined condition and the movement indication correspond to a partial area of the first object related to the first feature point group and an area of a predetermined block of the predetermined position;
wherein when the partial area is greater than the area of the predetermined block, the guidance circuit does not generate the movement indication, and the operation circuit generates first image rectification parameters corresponding to the multi-camera system according to the first feature point group corresponding to the predetermined position within the image capture range.

18. An operation method of a calibration guidance system, the calibration guidance system comprising a feature extraction circuit, a guidance circuit, and an operation circuit, the operation method comprising:
the feature extraction circuit executing a feature extraction operation on a first image group comprising a first object captured by a multi-camera system to generate a first feature point group corresponding to a predetermined position within an image capture range of the multi-camera system, wherein the first object is a physical object for calibrating the multi-camera system, rather than at least one pixel of the first image group; and
when a number of first feature points of the first feature point group corresponding to the predetermined position is greater than a predetermined number, the guidance circuit generating at least one movement indication according to a first area corresponding to the first feature points and an area of a predetermined block;
wherein when the first area is greater than the area of the predetermined block, the operation circuit further generates first image rectification parameters corresponding to the multi-camera system according to the first feature point group corresponding to the predetermined position within the image capture range.

* * * * *